May 24, 1932.  L. T. FUTSCHER  1,859,963

CLUTCH

Filed Oct. 1, 1930

Inventor
Leroy T. Futscher
By his Attorneys

Patented May 24, 1932

1,859,963

UNITED STATES PATENT OFFICE

LEROY T. FUTSCHER, OF MINNEAPOLIS, MINNESOTA, ASSIGNOR TO EDWIN R. BEEMAN, OF MINNEAPOLIS, MINNESOTA

CLUTCH

Application filed October 1, 1930. Serial No. 485,670.

My invention has for its object the provision of an extremely simple and highly efficient centrifugal force friction clutch and, to this end, it consists of the novel construction and arrangement of parts thereinafter described and defined in the claims.

This improved clutch, while intended for general use, is especially well adapted as a driving connection between an electric motor and positive operating connections for opening and closing garage doors and the like, where the action of the load is stiff and difficult to start due to the weight thereof and in such cases the clutch will permit the motor to build up a speed and gradually pick up the load. This action of the clutch permits the motor to overcome its static friction and the inertia of the load with a smooth action.

The invention further provides a clutch that is so evenly balanced in its action as to make the same especially well adapted for use in the operating connections for mechanism wherein, it is essential that vibration, produced by setting and releasing the clutch, is reduced to a minimum.

In the accompanying drawings, which illustrate the invention, like characters indicate like parts throughout the several views.

Referring to the drawings.

Figure 1:
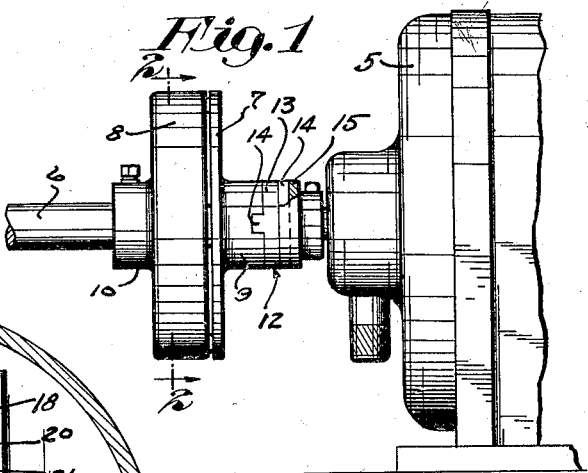
Fig. 1 is a fragmentary view in elevation showing the improved clutch arranged to connect the rotor shaft of an electric motor to a shaft to be driven therefrom.

The numeral 5 indicates an electric motor and the numeral 6 indicates a shaft axially aligned with the rotor shaft of said motor.

The improved clutch comprises a driving member in the form of a disk 7 and a driven member 8 in the form of a drum having an annular internal shoe-engaging surface. Formed with the outer face of the clutch member 7 is an outwardly projecting hub 9 and formed on the outer face of the back of the drum 8 is a hub 10. Both clutch members 7 and 8 are mounted on the shaft 6 which holds the same in true axial alignment and against angular or wobble movement in respect to each other. The clutch member 7 is loose on the shaft 6 and the drum 8 is rigidly secured thereto by a set-screw 11 that has threaded engagement with the hub 10 and impinges against said shaft, see Fig. 3.

A flexible coupling 12, of well-known commercial form, connects the rotor shaft of the motor 5 to the shaft 6. This coupling 12 includes a fibre disk 13 having on each face a diametrically extended tongue 14 and the two tongues 14 extend at right angles to each other. One of the tongues 14 loosely extends into a groove in the outer end of a hub 15 rigidly secured by a set-screw to the outer end of the rotor shaft of the motor 5 and the other tongue 14 loosely extends into a groove in the outer end of the hub 9.

Cast on the inner face of the clutch member 7 is a pair of parallel perpendicular flanges 16 which are laterally spaced to form, together with said clutch member, a diametrically extended channeled way or shoe guide 17 the ends of which terminate substantially at the periphery of said member. A pair of loose shoes 18 are loosely mounted in the way 17 at diametrically opposite points from the shaft 6. Each shoe 18 is in the form of a block, the outer end of which is on a curve having the same radius as the internal surface of the drum 8 for frictional contact therewith throughout the entire area thereof. The inner ends of the shoes 18 are notched to afford clearance for the shaft 6 and permit the required radial movements of said shoes in the way 17.

The drum 8 is preferably made from cast metal and the shoes 18 are preferably made from a non-metallic material, such as cork, to increase the frictional contact between said drum and shoes. These shoes 18 may also be made from a composition or a combination of different materials. The size of the shoes 18 is such that they freely move in the way 17 and between the clutch member 7 and the back of the clutch member 8 but at the same time, are held thereby against such angular movements in respect thereto that would interfere with the contact of the curved outer ends of said shoes with the drum 8 throughout their entire area. The shoes 18, under the rotation of the clutch member 7 by the motor 5, are arranged to be thrown radially outward from the shaft 6 by centrifugal force into frictional contact with the internal surface of the drum 8.

When the shoes 18 are made from cork or other relatively light material they are provided with weights 19 to accelerate their movements under centrifugal force into frictional contact with the drum 8. As shown, the weights 19 are embedded in the shoes 18 so that they do not come in contact with either the clutch member 7, drum 8 or the flanges 16.

Figure 3:
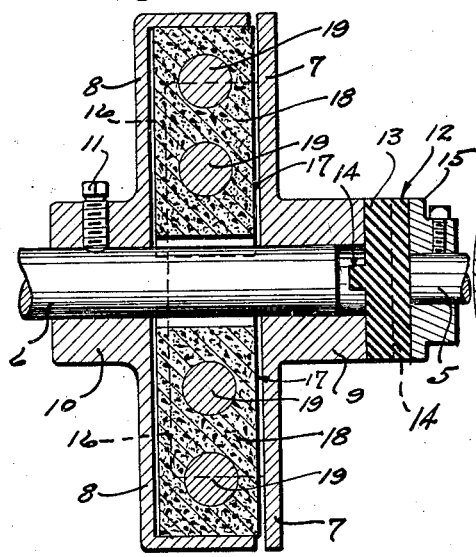
Fig. 3 is a view principally in section taken on the line 3—3 of Fig. 2.
Figure 2:
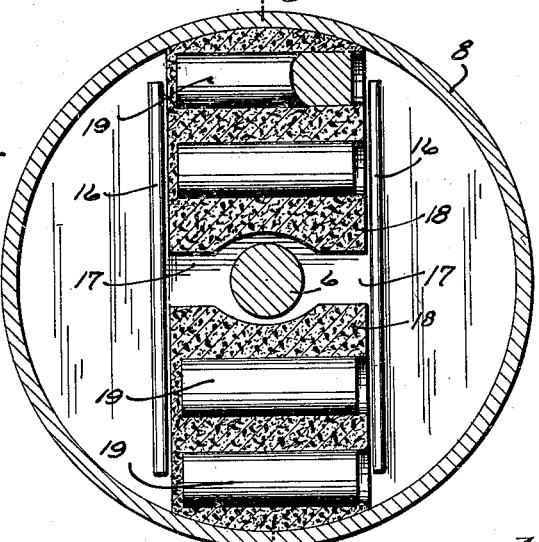
Fig. 2 is a view partly in elevation and partly in section taken on the line 2—2 of Fig. 1, on an enlarged scale.

Figs. 2 and 3 show each shoe 18 provided with two weights 19 each of which is in the form of a round metal bar mounted in a borelike cavity 20, which extends into said shoe from one edge thereof, and is securely held therein by friction or otherwise. The weights 19 are of the same weight and their positions in the shoes 18 are exactly the same so that the action of said shoes on the drum 8, at diametrically opposite points under the action of centrifugal force, is the same; or, in other words, these equally balanced shoes 18 move at the same rate of speed and force during the setting and releasing of the clutch, and hence, prevent vibrations in the clutch that would otherwise be produced by the contact of the shoes 18 with the drum 8 and the releasing of the same therefrom at different times and under unequal pressure. Furthermore, by holding the clutch members 7 and 8 in true axial alignment, which is accomplished as shown by mounting said members on the same shaft, materially assists the equally balanced shoes 18 in accomplishing the result desired. The weights 19 in each shoe 18 are laterally spaced radially from the axis of the shaft 6 and their axes are in the plane of rotation of the clutch and at right angles to the direction of travel of said shoes in the way 17.

Figure 4:
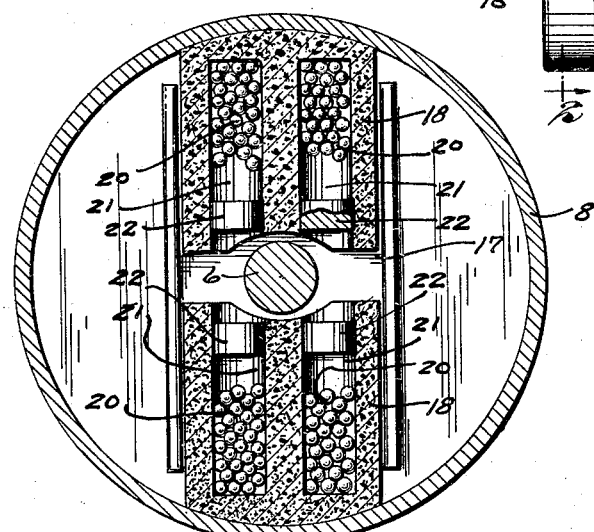
Fig. 4 is a view corresponding to Fig. 3 but showing a different type of weight in the shoes.

Fig. 4 shows a structure identical with that shown in Figs. 1, 2 and 3 and the parts thereof have the same reference characters except as to the weights which are designated by the numeral 20. The weights 20, shown in Fig. 4, are variable and shiftable in the shoes 18. These weights 20 each include a body made up of a multiplicity of shot loosely held confined in a cavity 21 formed in the respective shoe 18 and closed by a stopper 22 preferably of the same material as the shoe.

The shiftable weights 20 move outward in the cavities 21 under centrifugal force during the rotation of the clutch member 7 by the rotor shaft of the motor 5 and tightly press the shoes 18 against the drum 8. These weights 20 may be varied, at will, by removing part of the shot or adding other shot thereto. By forming the weights 20 each from the same number of shot, said weights will be equally balanced. The two cavities 21 in each shoe 18 have their axes spaced equidistances from the centers of said shoe both as to thickness and width thereof.

Operation of clutch

Under normal conditions the improved clutch will carry a load up to the speed of the motor in the same manner as an ordinary direct connected drive.

However, in case the load is stiff or difficult to start due to weight, the clutch is designed to permit the motor to build up a speed and then pick up the load gradually, and as previously stated, this tends first, to overcome the static friction of the motor and thereafter, when the speed of the motor has been built up, overcome the inertia of the load with a result that the load is easily started with a smooth action.

A very important feature of this clutch is that it tends to keep the starting current of the motor down so that there is no excessive starting current on a heavy load which protects the motor and permits the proper fusing thereof.

The action of the clutch

The driving clutch member 7 being fast on the rotor shaft of the motor 5 is free to turn within the drum 8 when the motor 5 is at rest or, when turned by hand power is transmitted from the driving member 7 through the shoes 18 to the drum 8. When the current is applied to the motor 5 the clutch member 7 and shoes 18 rotate within the drum 8 for an instant before the speed reaches a point at which the shoes 18 engage the drum 8. As the speed of the motor 5 increases, which it does very quickly, the centrifugal force of the shoes 18 overcomes the restraining force of the load. If the load can be started readily the speed continues to increase until a maximum speed and centrifugal force of the clutch is in action.

However, if the load is stiff for some reason and requires high initial torque to set it in motion the action is different. In this case, since the characteristic of the load prevents the drum from turning freely, the friction between the shoes 18 and the drum 8 slows the motor down to a speed at which the centrifugal force of the shoes 18 is overcome and allows the clutch to slip or release. The motor 5 then comes up to speed again and the shoes 18 engage the drum 8. This action takes place very rapidly and since the shoes 18 come in contact with the drum 8 very quickly a high torque is transmitted to the load. The intensity of this action is increased until the heat generated by the friction of the shoes 18 on the drum 8 increases a coefficient of friction by said shoes and drum to a point where the entire kinetic energy of the motor 5 is transmitted to the load. The result is a starting torque many times greater than full load torque sufficient to start even the most obstinate load.

On a heavy load the action continues until the load is started or until the load overcomes the centrifugal force and holding power of the clutch, without damaging the clutch or equipment.

What I claim is:

1. A clutch comprising a driving member and a driven member, one of which is a drum and the other of which is provided with a single channeled shoe guide which extends into the drum and substantially the full diameter thereof, and a pair of loose shoes loosely held by the guide for contact with the drum at diametrically opposite points and subject to centrifugal force during rotation of the respective member.

2. The structure defined in claim 1 in which the shoe is block-like and its width is slightly less than that of the guide.

3. A clutch comprising a driving member and a driven member, one of which is a drum and the other of which is provided with a shoe guide extending into the drum, a loose shoe loosely held by the guide for contact with the drum and subject to centrifugal force during rotation of the respective member, and a cylindrical weight in the shoe which extends radially thereof.

4. The structure defined in claim 3 in which the outer end of the weight terminates short of the outer end of the shoe and is covered thereby.

5. A clutch comprising a driving member and a driven member, one of which is a drum and the other of which is provided with a shoe guide extending into the drum, a loose shoe loosely held by the guide for contact with the drum and subject to centrifugal force during rotation of the respective member, and a pair of weights in the shoe laterally spaced circumferentially of the drum and positioned equal distances from the transverse center of the shoe.

6. The structure defined in claim 5 in which the weights are independently variable.

7. A clutch comprising a driving member and a driven member, one of which is a drum and the other of which is provided with a shoe guide extending into the drum, a loose block-like shoe loosely held by the guide for contact with the drum and subject to centrifugal force during rotation of the respective member, said shoe having a closed internal cylindrical chamber which extends radially thereof, and a shiftable weight in the chamber subject to centrifugal force during rotation of the respective member.

8. A clutch comprising a driving member and a driven member, one of which is a drum and the other of which is provided with a shoe guide extending into the drum, a loose shoe loosely held by the guide for contact with the drum and subject to centrifugal force during rotation of the respective member, said shoe having two closed internal chambers laterally spaced circumferentially of the drum and positioned equal distances from the transverse center of the shoe, and a shiftable weight in each chamber subject to centrifugal force during rotation of the respective member.

9. The structure defined in claim 8 in which each weight is individually variable.

10. A clutch comprising a driving member and a driven member, one of which is a drum and the other of which is provided with a pair of laterally spaced parallel flanges arranged to form a single radial shoe guide which extends into the drum and substantially the full diameter thereof, and a pair of loose block-like shoes loosely held by the guide for contact with the drum at diametrically opposite points and subject to centrifugal force during rotation of the respective member.

11. A clutch comprising a driving member and a driven member, one of which is a drum and the other of which is a disk forming one of the heads of the drum, each of said members having an external hub for securing the same to a shaft, said disk having on its inner face a pair of laterally spaced parallel flanges arranged to form a single radial shoe guide which extends into the drum and substantially the full diameter thereof, and a pair of loose block-like shoes loosely held by the guide for contact with the drum at diametrically opposite points and subject to centrifugal force during rotation of the respective member, the inner ends of the shoes being closely positioned, the one in respect to the other.

In testimony whereof I affix my signature.

LEROY T. FUTSCHER.